United States Patent [19]

Harney et al.

[11] Patent Number: 4,791,594
[45] Date of Patent: Dec. 13, 1988

[54] RANDOM-ACCESS PSUEDO RANDOM NUMBER GENERATOR

[75] Inventors: Kevin Harney, Brooklyn, N.Y.; Michael Keith, Washington Crossing, Pa.

[73] Assignee: Technology Inc. 64, Princeton, N.J.

[21] Appl. No.: 845,196

[22] Filed: Mar. 28, 1986

[51] Int. Cl.$^4$ .............................................. G06F 1/02
[52] U.S. Cl. .................................................... 364/717
[58] Field of Search .................... 364/717; 331/78; 380/46

[56] References Cited

U.S. PATENT DOCUMENTS 3,706,941 12/1972 Cohn ...................................... 331/78
4,047,008 9/1977 Perkins ................................. 235/152
4,142,240 2/1979 Ward et al. ......................... 364/717

Primary Examiner—Gary V. Harkcom
Assistant Examiner—Tan V. Mai
Attorney, Agent, or Firm—Eugene M. Whitacre; Paul J. Rasmussen; Eric P. Herrmann

[57] ABSTRACT

A system for generating a series of psuedo random numbers so that numbers in the sequence may be randomly accessed. The system includes apparatus for scrambling the bits of a plurality of seed numbers. The pattern of bit scrambling is governed by the control number. The plurality of scrambled seed numbers are exclusive-OR'ed to produce an output number. As long as the seed numbers remain unchanged, a given control number will always produce the same psuedo random number.

12 Claims, 2 Drawing Sheets

RANDOM-ACCESS PSUEDO RANDOM NUMBER GENERATOR

FIELD OF INVENTION

The present invention relates to computer circuits for generating psuedo random numbers.

BACKGROUND OF THE INVENTION

In computerized video graphics systems, it is often desired to fill a sizeable area on the screen with a random texture pattern. For example, a large grassy field or a macadam roadway may be displayed this way. The texturing may be easily accomplished by using a randomly generated number to create each picture element (pixel) in the area. For the moment, assume that the graphic object having the random texture is drawn so that it lies entirely within the display screen. Successive random numbers can be used to generate the object by displaying the pixels in some predetermined order, for example, in raster scan order. By way of an example, FIG. 1 shows a square object 10 sixty-four pixels wide by sixty-four pixels high for a total of 4096 pixels, which can be displayed by scanning each row of sixty-four pixels in succession. If the square 10 is to have a random texture pattern when it is displayed, the value for each pixel may be selected from a sequence of 4096 random numbers. Each random number is sent to a video display processor where it selects the color and luminance for the corresponding pixel.

Most random number generators used in computers generate numbers by synthesizing the equation $y = AX + B$. This equation is easily implemented in hardware using a shift register with feedback. The values for A and B are chosen based on the digital word size of the computer. Initially X is the value of a "seed number" that is loaded into the shift register. Thereafter the value of X is the previously generated random number. These generators produce one number of the random sequence each time they are accessed. Being serial in nature, the random number generators always present the next number in the sequence and cannot skip around in the sequence. The numbers generated by this method are known as congruential numbers and give a uniform distribution with favorable overall statistics. Since by using the same seed numbers for the random number generator the same sequence of numbers can be produced, there is no need to store the pixels for the square. Each time the display is to be refreshed the random number generator can be accessed to create the same texture pattern.

There are several problems with conventional random generators. Because the shift register employs the previous number to generate the next number in the sequence, there is a high correlation between consecutive random numbers. If these random numbers are used to generate a texture display pattern, the correlation between the numbers in the sequence will appear as an obvious visible pattern in the picture.

A second more serious problem arises when the square 10 moves to a position where it is only partially on the display screen (i.e., it is clipped). Then in order to properly display the partial square with the same texture pattern as when it was entirely on the screen, the whole object including those portions that are off the screen must be regenerated. This is because in order for the random number generator properly to create the same texture pattern it must step through the same 4096 number sequence as when the entire square 10 was within the display screen. This is very inefficient and time-consuming.

A related problem occurs if the textured object is rotated on the screen. In this case the rows of the object's pixels no longer coincide with the video scan lines. To display the object in video raster scan order, the random numbers must be obtained in a non-sequential fashion, i.e., step through the random number sequence in increments other than one. For example, if the square 10 in FIG. 1 was rotated 45 degrees so as to appear as a diamond, the raster scan sequence of its pixels would no longer be a row at a time, but rather would be diagonally across the square. In this case, the first pixel 12 in the last row of the object is scanned before last pixel 14 in the first row. The sequence of 4096 random numbers is no longer being used in the order they are generated to create the square 10. The pixel values are obtained by random access to the number sequence, according to the new diagonal scan pattern. However, with congruential psuedo random number generators the numbers may be read out only in a serial fashion, i.e., stepping through the sequence in increments of only one. These devices cannot randomly access the numbers in the sequence.

SUMMARY OF THE INVENTION

A digital system for generating a psuedo random number by rearranging the bits in a seed number. The rearrangement is carried out in response to the value of a control number. As long as the seed number remains constant, a given control number will always generate the same psuedo random number.

DETAILED DESCRIPTION OF THE PREFERRED EMBODIMENT

Figure 2:
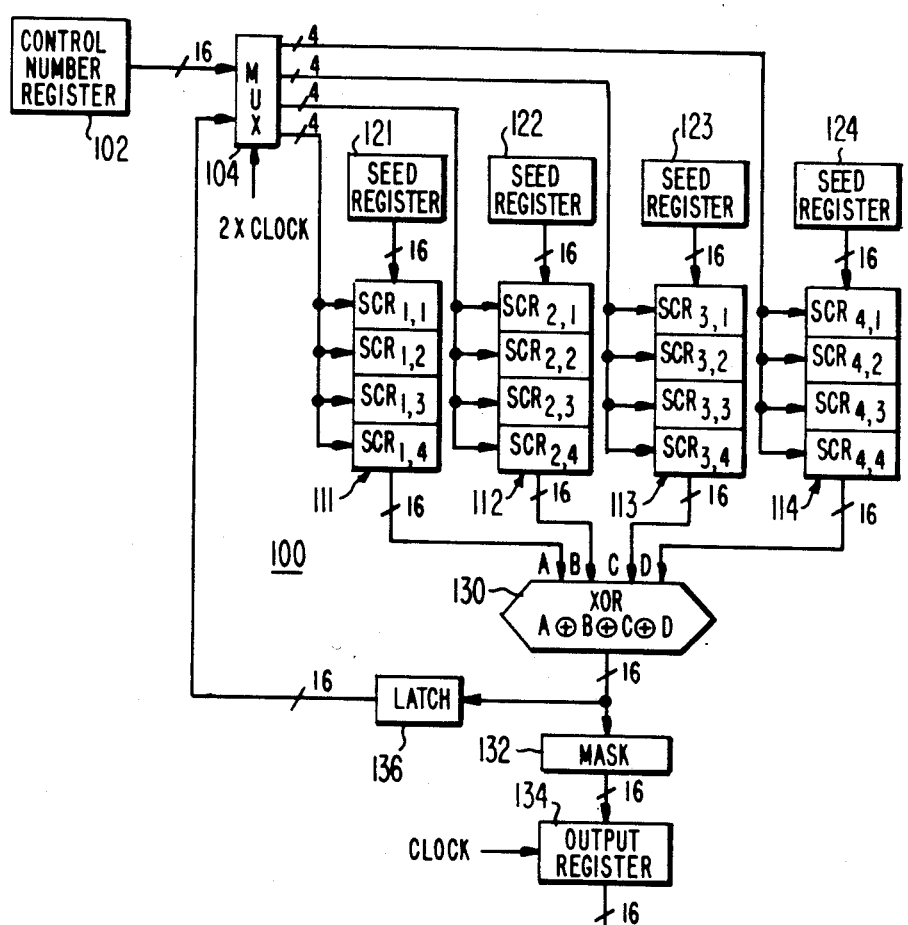
FIG. 2 is a block schematic diagram of one embodiment of the present invention. The lines connecting each block represent parallel data buses. The number adjacent to a slash across the bus indicates the number of data lines in the bus.

With initial reference to FIG. 2, a psuedo random number generator 100 includes a control number register 102 which is capable of storing a 16 bit digital number. When the generator 100 is incorporated in a computer video display system, the control number register may be loaded from the data bus of that computer system. The 16 bit parallel output of the control number register 102 is fed as one input to a first 2×1 multiplexor (MUX) 104. MUX 104, in response to a clock signal at twice the normal system clock of the video display system, connects one of the two 16 bit input signals to four output ports. The first MUX divides the 16 input bits into four sets of four bits each and applies a different set to each output port.

Each output port from MUX 104 consists of four parallel lines which are connected to a different one of a series of four scrambler banks 111–114. Each scrambler bank comprises four individual scrambler units designated SCRm,n where m is the number of the bank and n is the number of the scrambler within the bank. The scramblers in each bank are connected in cascade so that the output of the first scrambler of each bank (SCRm,1) is connected to the input of the second scrambler (SCRm,2) and the output of the second scrambler is connected to the input of the third scrambler (SCRm,3) and so on. Each scrambler has a control input terminal to which one of the lines from the MUX 104 is connected. The embodiment of FIG. 2 can be modified to provide a greater or fewer number of scramblers in each bank, but the randomness statistics may not be as good with fewer stages.

The input of the first scrambler (SCRm,1) in each bank 111-114 is connected to the parallel output of one of four seed registers 121-124, respectively. Each seed register contains a 16 bit number which may be loaded from the computer system incorporating the generator 100. The output of each seed register 121-124 is coupled via a 16 line bus to the input of the first scrambler of the corresponding bank 111-114. Each line carries one bit of the 16 bit seed number stored in the register 121-124. The lines and the bits carried thereon are ordered so that the parallel bit pattern on the 16 lines represents the digital number stored in the seed register.

Figure 3:
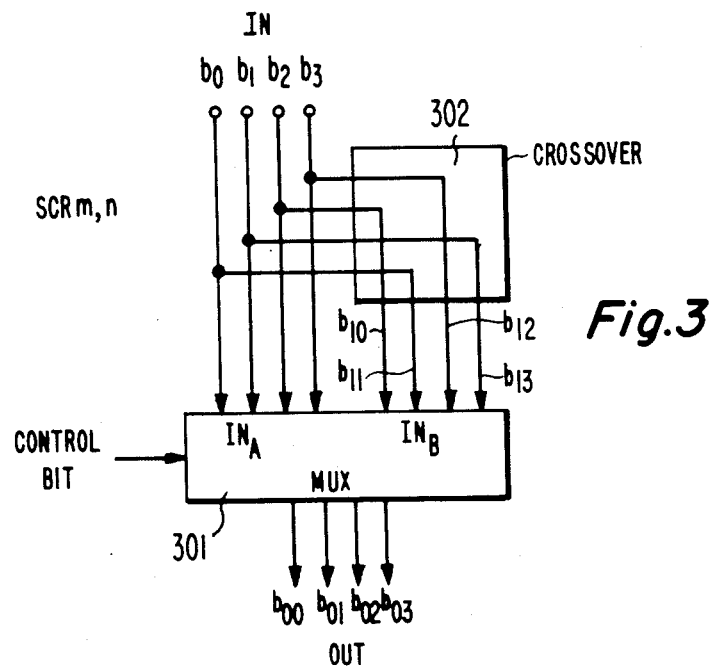
FIG. 3 is a four bit scrambler of the type which could be used in the FIG. 2 circuit.

FIG. 3 shows a typical circuit for one of the scramblers SCRm,n. For simplicity, the FIG. 3 circuit is shown for scrambling only 4 bits whereas the actual scrambler (SCRm,n) would operate on 16 bits. The scrambler receives at its input port (IN) four bits labeled $b_0$ through $b_3$ which come from one of the seed registers 121-124 or another scrambler depending on the position of the given scrambler (SCRm,n) in the bank. The input bits are applied directly to one input ($IN_A$) of a second 2×1 multiplexor 301. The four input bits are also supplied to the second input ($IN_B$) of MUX 301 via a bit crossover network 302. The crossover 302 uses hard wired innerconnections to rearrange the order of the bits between its input and output connections. Specifically as shown in FIG. 3, input bit $b_0$ is connected to output bit $b_{11}$, input bit $b_1$ is switched to bit $b_{13}$, input bit $b_2$ becomes $b_{10}$ and input bit $b_3$ is connected to bit $b_{12}$ at the second ($IN_B$) input of MUX 301. The rearrangement of the bits in the crossover 302 may be different for each of the various scramblers in FIG. 2.

The second MUX 301, in response to the control bit from MUX 104, connects either the four bits from the input terminal or the four bits from the crossover 302 to its output. Specifically, if the bit of the control bit is a zero, MUX 301 will pass the input bits directly to the output. If the control bit is a one, then MUX 301 connects the output bits from the crossover 302 to its output thereby producing a scrambling of the bits as applied to the input of the FIG. 3 circuit, hence the name scrambler.

Figure 4:
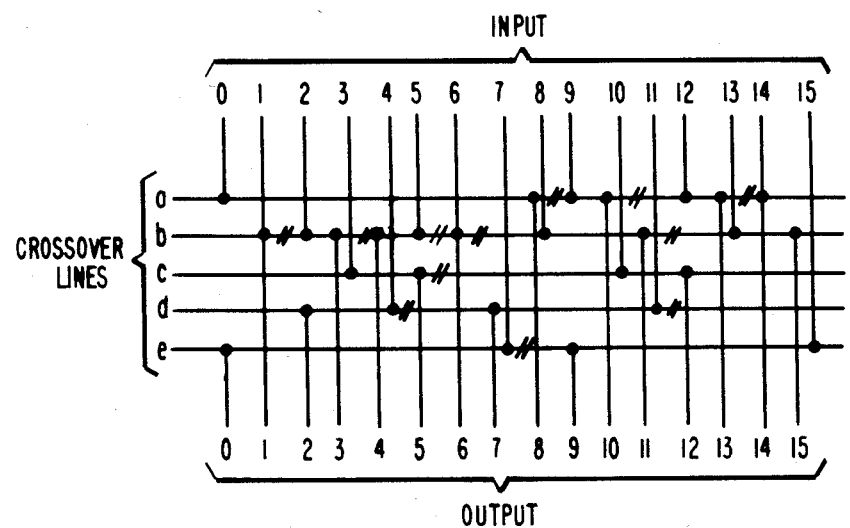
FIG. 4 is a sixteen bit crossover circuit.

As noted at the outset of the description of FIG. 3, the circuitry is shown for scrambling only four bits for simplicity. FIG. 4 shows an efficient way of implementing the crossover 302 for sixteen bits. This configuration has particular advantages when implementing the crossover in an integrated circuit. Each of the sixteen input lines of the crossover circuit is connected to one of five crossover lines, lettered a-e. In the particular interconnection of FIG. 4, input line 0 is connected to crossover line a and input line 1 is connected to crossover line b. Each of the sixteen output lines also is connected to one of the crossover lines. The double slashes (//) at various points on the crossover lines indicate where the crossove lines have been cut. For example, both input lines 1 and 2 are connected to crossover line b. However, as line b is cut between input lines 1 and 2, the signal on input line 1 goes only to output line 1 and the signal on input line 2 goes only to output line 3.

The present inventors have realized that sixteen bits may be effectively scrambled using as few as five crossover lines. Different scrambling patterns may be obtained by rearranging the input and output line connections to the crossover lines and the points at which the crossover lines are cut.

Returning to FIG. 2, it is apparent that each bank of scramblers 111-114 operates on the seed number four times before passing it to the output of the fourth scrambler in the bank (SCRm,4). Therefore, depending upon the four bits from the control number which are applied to that bank, the seed number may not be scrambled at all if the four control bits are all zeros, it may be scrambled four times if those control bits are all ones, or any combination of scrambling in between. Therefore, the bits in the seed number may be scrambled up to four times.

The 16 bit parallel output from each of the scrambler banks 111-114 is applied to a four input exclusive-OR gate (XOR) 130 which exclusive-OR's the four numbers to produce a 16 bit output number. The parallel output number from the XOR 130 is stored in a 16 bit latch 136 whose output is connected to the second input of the first MUX 104. The XOR output is also connected to a mask 132. The mask 132 may be viewed as a 16 bit AND gate which AND's the output of the XOR 130 with a masking number supplied by the computer system. The 16 bit output number from the mask is connected to the input of an output register 134 where it is temporarily stored. The contents of the output register 134 are read out in response to the system clock signal at a control terminal of the register. The number in the output register upon read out represents the psuedo random number generated by the system 100.

The operation of the random number generator 100 begins by loading four seed numbers in the seed registers 121-124 and the control number into register 102. The two times the system clock signal causes the first MUX 104 to initially connect the output from the control number register to the output ports of the first MUX, transmitting the control number to the control inputs of the scrambler banks 111-114. The scrambler banks reorganize the bits of the seed numbers according to the bit pattern of the control number to produce four 16 bit numbers at the output of each of the banks. The four scrambler bank outputs are then exclusive-OR'ed in XOR 130 to produce a single 16 bit number. With minor modification to the system a greater or fewer number of banks or scramblers within each bank may be used to vary the random number generation process.

This XOR output number is then stored in latch 136 and coupled back to the other input of the first MUX 104. On the second cycle of the two times the system clock signal, the 16 bit number from latch 136 is used in place of the control number to govern reordering the bits of the seed numbers in the scrambler banks 111-114. A second pass is made through the scrambler banks changing the order of the seed number bits a second time according to the pattern of the 16 bit number from the XOR 130. This further scrambles the four seed numbers to produce a second set of four 16 bit numbers at the output of the scrambler banks 111-114. These numbers are then exclusive OR'ed in XOR 130 to produce another single 16 bit number. On the second pass, the number from XOR 130 passes through mask 132 and is stored in the output register 134. On this pass the output register receives a clock signal which allows it to transmit its contents to the output port as the psuedo random number from generator 100.

Figure 1:
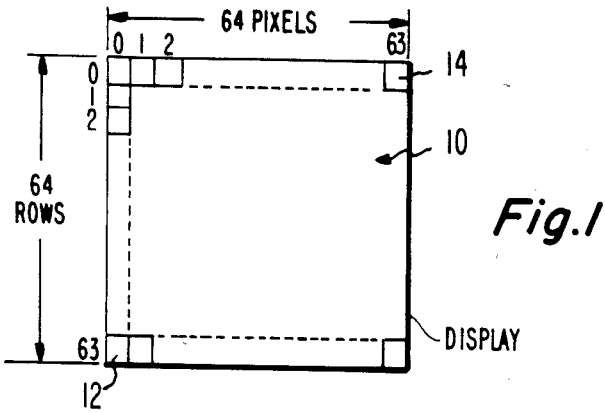
FIG. 1 represents a square object to be displayed using the random number generator of the present invention to create a random texture pattern.

It is apparent from the operation of the psuedo random number generator 100 that as long as the four seed numbers remain constant, a given control number will always generate the same random number. If the random number generator is used to create the texture pattern for a video display object, the coordinates of the pixel within the object may be used as the control number for the generator. For example, if the square 10 in FIG. 1 is the object to be displayed, the control number may be the X-Y location of a given pixel within the square. In this case, the first eight bits of the control number could represent the number of the column in which the pixel is located and the second eight bits of the control number could represent the number of the row in which the pixel is located. As the object is being displayed, the coordinates of each pixel are sequentially sent to the control number register 102 to generate a random pixel value in the output register 134. Each pixel value is then sent to the video display processer to create a video signal representing the object.

If only a part of the object is on the screen, just the coordinates of the pixels appearing on the screen are sent to the random number generator. This creates only that portion of the texture pattern for just the visible part of the object without having to generate random numbers for all of the entire object. If the object is rotated, the pixels may be generated in the same order as they are displayed regardless of the orientation of the rows of pixels in the object to the video scan lines. Therefore, regardless of the order in which the pixels are displayed or whether only a portion of the object is actually displayed, the coordinates of a given pixel will always produce the same random number from the generator 100 and therefore that pixel will always have the same color and luminance. As a result, the texture of the overall square 100 will remain constant as it is moved about the video display.

The function of mask 132 is to filter out undesirable random numbers. For example, if the number is used to generate pixel values, the mask guarantees that the range of pixel values falls within those which produce realistic colors. This masks or screens out certain bits in the output of the XOR 130 which would produce unacceptable colors, for example the color red would be prevented from being used in a texture for a grassy area.

What is claimed is:

1. A digital system for generating a psuedo random number from at least one seed number using a control number said system comprising:
    means for providing said seed number, said seed number being in multi-bit digital format;
    means, having an input port coupled to said means for providing said seed number, having a control input terminal and having an output port, for selectively rearranging the order of bits of said seed number responsive to said control number applied to said control input port; and
    means, coupled to the output port of said means for rearranging, for providing said control number to said control input terminal.

2. The system set forth in claim 1 wherein said means for rearranging comprises a plurality of bit scramblers arranged in a cascade connection; each of said scramblers having input and output ports and having a control input terminal to which a bit of the control number is applied; the seed number being applied to the input port of the first scrambler in the cascade; each scrambler applying the number received at its input port to its output port if said control number bit has a first value, or rearranging the bits in the number received at its input port and applying the rearranged number to its output port if said control number bit has a second value.

3. The system set forth in claim 2 wherein each bit scrambler comprises:
    an input port for receiving in parallel a plurality of digital bits having a given order;
    a multiplexor having a plurality of input ports for selectively connected one input port of said plurality of input ports to an output,
    means for directly connecting the input port to one input port of said plurality of input ports; and
    means for rearranging the order of said bits received at said input port, coupled between said input port and another of said plurality of input ports.

4. A digital system for generating a psuedo random number from a plurality of seed numbers using a control number, said system comprising:
    a source of a plurality of digital seed numbers, each of said seed number being in multi-bit digital format;
    means for providing a multi-bit control number;
    means, connected to said source, for rearranging the order of the bits in each of the seed numbers in response to the value of at least a portion of said control number, and
    means for combining each of the rearranged seed numbers into a single number.

5. The system as in claim 4 wherein the source comprises a plurality of registers each for storing one of the seed numbers.

6. The system as in claim 5 wherein the rearranging means comprises a plurality of banks of bit scramblers, each bank connected to a separate seed register and including means for repetitively rearranging the bits in the seed number in the register coupled respectively thereto.

7. The system as in claim 6 wherein each bank comprises a plurality of bit scramblers arranged in a cascade connection; each of said scramblers having input and output ports and having a control input terminal to which a bit of the control number is applied; the seed number being applied to the input port of the first scrambler in the cascade; each scrambler applying the number received at its input port to its output port if said control number bit has a first value, or rearranging the bits in the number received at its input port and applying the rearranged number to its output port if said control number bit has a second value.

8. The system in claim 7 further including means for applying a bit of the control number to each scrambler.

9. The system as in claim 8 wherein said means for applying a bit of the control number includes a multiplexor having one input coupled to said means for providing the control number and another input coupled to the output of said means for combining, said multiplexor having parallel outputs connected to said banks of bit scramblers to provide said control number thereto.

10. The system as in claim 7 wherein the combining means comprises an exclusive-OR circuit.

11. A digital system for generating a psuedo random number from a plurality of seed numbers using a control number, said system comprising:
  a source of a plurality of multi-bit digital seed numbers;
  means for providing said control number;
  means, coupled to said source, for rearranging the order of bits in each of the seed numbers responsive to the value of at least a portion of said control number; and providing respective output values corresponding to respective seed numbers at an output thereof; and
  means coupled to said output, including means for exclusive-ORing ouptut values corresponding to said respective seed numbers to provide said psuedo random number.

12. A digital system for generating a psuedo random number from a plurality of seed numbers using a control number, said system comprising:
  a source of a plurality of digital seed numbers, each of said seed number being in multi-bit digital format;
  means for providing a multi-bit control number;
  means connected to said source for rearranging the order of the bits in each of the seed numbers in response to the value of at least a portion of said control number; and
  means for combining each of the rearranged seed numbers into a single number; and
  means for masking various bits in the number from the output of said combining means.

* * * * *